Patented June 15, 1948

2,443,503

UNITED STATES PATENT OFFICE 2,443,503

HYDROGEN PEROXIDE BY THE PARTIAL OXIDATION OF HYDROAROMATIC HYDROCARBONS

Charles R. Harris, Lockport, N. Y., assignor to E. I. du Pont de Nemours & Company, Wilmington, Del., a corporation of Delaware No Drawing. Application April 19, 1946, Serial No. 663,605

10 Claims. (Cl. 23—207)

This invention relates to the oxidation of hydrocarbons and particularly to a method for producing hydrogen peroxide by the partial oxidation of certain hydroaromatic hydrocarbons.

It is an object of the present invention to provide a novel method for the obtainment of hydrogen peroxide. A further object is a method of obtaining hydrogen peroxide which involves the partial oxidation of certain hydroaromatic hydrocarbons whereby hydrogen peroxide and other products are obtained. Further objects will be apparent from the following description of the invention.

The above objects are accomplished in accordance with the invention by subjecting certain hydroaromatic hydrocarbons to partial oxidation under specific reaction conditions. I have found that when carrying out such oxidation reactions under such conditions, hydrogen peroxide is formed in quantities representing substantial yields. Other products are simultaneously formed, but the identity of all such products has not been established.

The hydrocarbons which may be used in accordance with the invention are dihydrobenzenes, hydronaphthalenes, hydrophenanthrenes, hydroanthracenes, and the alkyl derivatives of the above compounds which contain from 1 to 4 carbon atoms in each alkyl substituent group. Not all of the above hydrocarbons are suitable for practicing the invention, since in order for a compound to be suitable it must contain at least 1 dihydrobenzene nucleus in its structure. The dihydrobenzene nucleus may be either the 1,4-dihydrobenzene nucleus or the 1,2-dihydrobenzene nucleus.

Specific examples of hydroaromatic compounds of the above type which may be used in practicing the invention are 1,2-dihydrobenzene, 1,4-dihydrobenzene, 1,3-dimethylcyclohexadiene-1,3, 1,4-dimethyl-cyclohexadiene - 1,3, 1,4 - dihydronaphthalene, 1,2-dihydronaphthalene, 9,10-dihydrophenanthrene, 9,10-dihydroanthracene and 1,2,3,4,9,10-hexahydroanthracene. Of the above compounds, I prefer to employ the dihydrobenzenes and the dihydronaphthalenes since those compounds are more readily available.

The reaction to form hydrogen peroxide appears to involve the removal of two atoms of hydrogen from one molecule of the hydroaromatic compound, which hydrogen reacts with one mol of oxygen to form hydrogen peroxide. Almost invariably, there is also formed along with the hydrogen peroxide other partial oxidation products particularly aldehyde or ketone products. Some of the hydrogen peroxide produced may react with such carbonyl type products to produce organic peroxides, however, hydrogen peroxide is the predominant peroxygen product and may be recovered as such.

The partial oxidation of the above hydrocarbons may be carried out under various conditions, e. g., either in the liquid or vapor phase, and over a rather wide temperature range. Preferably, the reaction is effected in the vapor phase in the absence of materials which would act to catalyze the decomposition of hydrogen peroxide. The vapor phase reaction is best carried out in a zone containing no catalytic or contact material.

The operable and preferred temperatures will vary somewhat depending upon the particular hydrocarbons employed, but in general the reactions may be carried out at temperatures within the range 200 to 550° C. The preferred range is 250 to 450° C.

When carrying out the reaction in the vapor phase, the ratio of hydrocarbon to oxygen may be varied considerably, but I prefer to employ at least 1 volume of hydrocarbon vapor per volume of oxygen in the reaction mixture. Best results are realized when using 2.5 to 10 volumes of hydrocarbon vapor per volume of oxygen. Larger amounts of hydrocarbon vapors, e. g., up to 50 volumes per volume of oxygen may also be used if desired. The amount of oxygen present in the total gaseous reaction mixture preferably should not exceed about 20% by volume.

Instead of using oxygen, air may be employed as the oxidizing gas in which case the nitrogen present in the air functions as a diluent. Diluents other than nitrogen, for example water vapor, may also be used. The amount of diluent gases other than excess hydrocarbon preferably should not exceed about 60% of the total gas volume. Stated differently, the total volume of hydrocarbon vapor being utilized plus the oxygen content of the gas mixture should not be less than about 40% of the total gas mixture.

I have discovered that best results are obtained under such conditions that not more than about 90% of the oxygen employed is reacted. By removing the mixed reaction products from the reaction zone when not more than the above amount of oxygen has been consumed, the yield of hydrogen peroxide is increased, and the formation of by-product carbonyl compounds is reduced.

The vapor phase reaction may be carried out by either premixing the reactant gases before passage into a zone heated to the required temperature, or the hydrocarbon and the oxygen may be preheated separately before passage into such a zone. After reaction is effected, it is preferable to cool the mixed reaction products rapidly down to about room temperature for the purpose of preventing side-reactions, particularly reactions involving the hydrogen peroxide and carbonyl type reaction products.

The invention is further illustrated by the following examples in which the active oxygen content, whether in the form of hydrogen peroxide or an organic peroxide, is reported as hydrogen peroxide. Similarly, all of the carbonyl type compounds formed are reported in terms of formaldehyde, since the identity of the compounds has not been established. The space velocities per hour (SVH) are in terms of the gas mixtures measured at standard temperatures and pressures.

*Example I*

A glass reaction tube 22 mm. in diameter and 2 feet long was thoroughly cleaned by means of nitric acid. The free gas space in the tube was 220 cc. The tube was mounted in a furnace with the inlet end connected to lines for delivering hydrocarbon vapor and air. The exit end of the tube was connected to a condenser in series with two water scrubbers. Experiments were carried out in which 1:1 mixtures of 1,4-dihydrobenzene vapors with air were passed into the reaction tube at various temperatures. Prior to use, the 1,4-dihydrobenzene was washed successively with the following: water, acidic potassium iodide solution, sodium thiosulfate solution and water, and then dried over anhydrous calcium chloride. The amounts of hydrogen peroxide, carbonyl type compounds (calculated as formaldehyde) and the percentage of oxygen reacted were determined by analysis of the products collected in the condenser and in the water scrubbers and by determining the volume and oxygen content of the gases passing through the water scrubbers. The results of the experiments are reported in the following table:

| Run | Temp., °C. | SVH | O₂ Reacted, (per cent) | Vol. per cent in Product Gas | | Ratio H₂O₂:CH₂O | H₂O₂ yield based on O₂ | |
|---|---|---|---|---|---|---|---|---|
| | | | | H₂O₂ | CH₂O | | Gross | Net |
| A | 330–47 | 288 | 95 | 4.28 | 3.28 | 1.3 | 42.8 | 45.1 |
| B | 320 | 288 | 46 | 4.15 | 0.84 | 4.9 | 41.5 | 90 |

*Example II*

This example consisted of a series of runs carried out in substantially the same manner as described in Example I employing a reaction tube 15 mm. in diameter and 2 feet long. The free gas space was 67.5 cc. The hydrocarbon employed was 1,4-dihydronaphthalene prepared by the sodium reduction of naphthalene in ethanol. The principal products of the reaction were hydrogen peroxide and naphthalene, along with carbonyl type by-product compounds. Tabulated below are the results obtained from three runs:

| Run | Feed Gas per cent Air | Temp., °C. | SVH | O₂ Reacted, (per cent) | Vol. per cent in Product Gas | | Ratio H₂O₂:CH₂O | H₂O₂ yield based on O₂ | |
|---|---|---|---|---|---|---|---|---|---|
| | | | | | H₂O₂ | CH₂O | | Gross | Net |
| A | 59 | 402–6 | 830 | 59 | 4.15 | 0.41 | 10.1 | 35 | 59.5 |
| B | 58 | 373–5 | 853 | 40 | 2.88 | 0.25 | 11.5 | 25.2 | 63 |
| C | 65 | 300–308 | 754 | 15 | 1.62 | 0.015 | 108 | 12.4 | 82.5 |

*Example III*

This example was carried out in the same general manner as described for Example I employing 1,2-dihydronaphthalene as the hydrocarbon reactant. The 1,2-dihydronaphthalene was prepared by rearranging 1,4-dihydronaphthalene in the presence of sodium ethylate in an ethanol solution at a temperature of about 150° C. The reaction tube described in Example II was used. The results of two runs carried out employing in each a mixture of the hydrocarbon vapor and air containing 58% of the latter was used.

| Run | Temp., °C. | SVH | O₂ Reacted, per cent | Vol. per cent in Product Gas | | Ratio H₂O₂:CH₂O | H₂O₂ yield based on O₂ | |
|---|---|---|---|---|---|---|---|---|
| | | | | H₂O₂ | CH₂O | | Gross | Net |
| A | 462 | 850 | 34.5 | 1.22 | 0.09 | 13.6 | 10.5 | 30.4 |
| B | 480–8 | 850 | 48.5 | 1.52 | 0.21 | 7.23 | 13 | 26.8 |

The unreacted hydrocarbon which passes through the reaction space may, of course, be recovered and recycled through the process. Also, by-products, such as benzene, naphthalene and the like, may be reconverted to the dihydro compounds and resubjected to partial oxidation as described above.

Since hydrogen peroxide is relatively unstable in the presence of many common structural materials, particularly at elevated temperatures, it is important that the reaction vessel be constructed of materials which do not catalyze hydrogen peroxide decomposition. Reaction vessels of iron, copper and the like should be avoided. This is particularly true where the reaction is carried out on a small scale using small reaction tubes so that the surface-volume ratio is large. Reaction vessels made of glass, quartz or enamelware may be used satisfactorily but even in such instances, it is generally desirable to clean the surfaces of the vessel before use, e. g., by means of nitric acid or hydrofluoric acid. For larger reaction vessels having low surface-volume ratios, the choice of the surface material which will contact the reaction gases becomes of less importance and various non-rusting metals or alloys, such as aluminum and the stainless steels, may be used advantageously. When using such metals as surface metal in large reaction vessels, the reactions may be carried out in such a manner that the surfaces of the vessels are cooled substantially below the temperature in the reacting body of gas, in which event any adverse effect from the metal surfaces will be minimized.

The hydrogen peroxide formed during the partial oxidation reaction may be recovered as such by condensation from the product gases and treatment of the condensate with water to extract the hydrogen peroxide. The water extracted may then be subjected to fractional distillation to separate the hydrogen peroxide in a purer form in which it may be used for various purposes. One such use is the preparation of solid peroxide compounds by reacting the aqueous solution obtained with substances, such as calcium hydroxide, sodium metaborate and zinc oxide, whereby peroxides, such as calcium peroxide, sodium perborate and zinc peroxide are obtained.

The hydrogen peroxide may also be recovered by scrubbing the product gases with cold water whereby a crude hydrogen peroxide solution containing, for example, 7 to 10% hydrogen peroxide by volume may be obtained, which solutions may be utilized for preparing sodium perborate, calcium peroxide, strontium peroxide, barium peroxide and the like by well-known methods.

While I prefer to carry out the partial oxidation of the above hydrocarbons in the vapor phase, reaction in the liquid phase may be particularly suitable in some instances, e. g., in those cases where the hydrocarbon is a liquid at the most favorable operating temperature. If desired, the liquid phase reaction may be employed even with compounds which are gaseous under ordinary pressures at the desired temperature by carrying out the reaction under superatmospheric pressure, e. g., pressure sufficient to maintain the hydrocarbon reactant in the liquid phase at the temperature of operation. Another manner of carrying out the reaction under liquid phase conditions is to pass a mixture of oxygen and the hydrocarbon vapor into a high boiling inert liquid in which the hydrocarbon vapor and oxygen are substantially soluble at the temperature of operation.

Since many changes may be made in the details set forth above, the invention is not to be restricted to such details except as indicated by the appended claims.

I claim:

1. A method for producing hydrogen peroxide comprising reacting a hydrocarbon with oxygen in the vapor phase at a temperature of 200–550° C. employing at least one volume of vapors of said hydrocarbon per volume of oxygen and terminating the reaction while a substantial amount of said oxygen is still unreacted, said hydrocarbon being selected from the group consisting of those dihydrobenzenes, hydronaphthalenes, hydrophenanthrenes and hydroanthracenes whose molecular structures include a dihydrobenzene nucleus, and alkyl derivatives of said compounds in which each alkyl substituent group contains less than 5 carbon atoms and whose molecular structures include a dihydrobenzene nucleus.

2. A method according to claim 1 wherein 2.5 to 10 volumes of hydrocarbon vapor are employed per volume of oxygen.

3. A method according to claim 1 wherein the reaction is carried out at a temperature of 250–450° C.

4. A method according to claim 1 wherein the reaction is carried out at a temperature of 250–450° C. employing 2.5 to 10 volumes of hydrocarbon vapor per volume of oxygen.

5. A method for producing hydrogen peroxide comprising reacting a hydrocarbon with oxygen at a temperature of 200–550° C. employing at least 1 volume of vapor of said hydrocarbon per volume of oxygen and terminating the reaction when not more than about 90 per cent of the oxygen is reacted, said hydrocarbon being selected from the group consisting of those dihydrobenzenes, hydronaphthalenes, hydrophenanthrenes and hydroanthracenes whose molecular structures include a dihydrobenzene nucleus, and alkyl derivatives of said compounds in which each alkyl substituent group contains less than 5 carbon atoms and whose molecular structures include a dihydrobenzene nucleus.

6. A method for producing hydrogen peroxide comprising passing a hydrocarbon vapor and oxygen into a reaction zone in the ratio of 2.5 to 10 volumes of said vapor per volume of oxygen, said vapor being the vapor of a hydrocarbon selected from the group consisting of those dihydrobenzenes, hydronaphthalenes, hydrophenanthrenes and hydroanthracenes whose molecular structures includes a dihydrobenzene nucleus, and alkyl derivatives of said compounds in which each alkyl substituent group contains less than 5 carbon atoms and whose molecular structures include a dihydrobenzene nucleus, reacting said vapor and oxygen in said zone at a temperature of 200 to 550° C. until not more than about 90 per cent of said oxygen is reacted, withdrawing product gases from said zone and recovering hydrogen peroxide therefrom.

7. A method for producing hydrogen peroxide comprising passing a hydrocarbon vapor and oxygen into a reaction zone in the ratio of 2.5 to 10 volumes of said vapor per volume of oxygen, the quantity of oxygen passed into said zone not exceeding 20 per cent by volume of all gases passed into said zone, said vapor and oxygen constituting at least 40 per cent by volume of all the gases passed into said zone, said vapor being the vapor of a hydrocarbon selected from the group consisting of those dihydrobenzenes, hydronaphthalenes, hydrophenanthrenes and hydroanthracenes whose molecular structures include a dihydrobenzene nucleus, and alkyl derivatives of said compounds in which each alkyl substituent group contains less than 5 carbon atoms and whose molecular structures include a dihydrobenzene nucleus, reacting said vapor and oxygen in said zone at a temperature of 200 to 550° C. until not more than about 90 per cent of said oxygen is reacted, withdrawing product gases from said zone and recovering hydrogen peroxide therefrom.

8. A method for producing hydrogen peroxide comprising reacting 1,4-dihydrobenzene vapor with oxygen at a temperature of 250 to 450° C. employing at least 1 volume of said vapor per volume of oxygen and terminating the reaction when not more than about 90 per cent of said oxygen is reacted.

9. A method for producing hydrogen peroxide comprising reacting 1,4-dihydronaphthalene vapor with oxygen at a temperature of 250 to 450° C. employing at least 1 volume of said vapor per volume of oxygen and terminating the reaction when not more than about 90 per cent of said oxygen is reacted.

10. A method for producing hydrogen peroxide comprising reacting 1,2-dihydronaphthalene vapor with oxygen at a temperature of 250 to 450° C. employing at least 1 volume of said vapor per volume of oxygen and terminating the reaction when not more than about 90 per cent of said oxygen is reacted.

CHARLES R. HARRIS.

REFERENCES CITED

The following references are of record in the file of this patent:

UNITED STATES PATENTS

| Number | Name | Date |
|---|---|---|
| 2,376,257 | Lacomble | May 15, 1945 |